United States Patent
Nicholas et al.

(10) Patent No.: US 7,297,897 B2
(45) Date of Patent: *Nov. 20, 2007

(54) PROCESS FOR LASER CUTTING A WORKPIECE

(76) Inventors: Antonios Nicholas, 46 Wilshire, Belle Mead, NJ (US) 08502; Michael Towler, 23660 Cass, Farmington, MI (US) 48335

(*) Notice: Subject to any disclaimer, the term of this patent is extended or adjusted under 35 U.S.C. 154(b) by 492 days.

This patent is subject to a terminal disclaimer.

(21) Appl. No.: 10/828,087

(22) Filed: Apr. 20, 2004

(65) Prior Publication Data

US 2004/0195215 A1    Oct. 7, 2004

Related U.S. Application Data

(62) Division of application No. 10/195,000, filed on Jul. 12, 2002, now Pat. No. 6,737,607, which is a division of application No. 09/811,152, filed on Mar. 16, 2001, now Pat. No. 6,423,933.

(51) Int. Cl.
    *B23K 26/04* (2006.01)
(52) U.S. Cl. .............................. 219/121.7; 219/121.83
(58) Field of Classification Search ............ 219/121.7, 219/121.67, 121.71, 121.73, 121.74, 121.75, 219/121.76, 121.78, 121.82, 121.83, 121.79; 250/559.29, 559.38
    See application file for complete search history.

(56) References Cited

U.S. PATENT DOCUMENTS

| 5,744,776 | A   | 4/1998  | Bauer            |         |
|-----------|-----|---------|------------------|---------|
| 5,883,356 | A   | 3/1999  | Bauer et al.     |         |
| 5,953,137 | A * | 9/1999  | Sirat et al.     | 359/30  |
| 5,979,931 | A   | 11/1999 | Totani et al.    |         |
| 6,139,049 | A   | 10/2000 | Gallagher        |         |
| 6,294,124 | B1* | 9/2001  | Bauer et al.     | 264/400 |
| 6,337,461 | B1* | 1/2002  | Yasuda et al.    | 219/121.62 |
| 6,423,933 | B2* | 7/2002  | Nicholas et al.  | 219/121.7 |
| 6,667,458 | B1* | 12/2003 | Sirat            | 219/121.83 |
| 6,720,567 | B2* | 4/2004  | Fordahl et al.   | 250/559.29 |
| 6,737,607 | B2* | 5/2004  | Nicholas et al.  | 219/121.7 |
| 2002/0153500 | A1 | 10/2002 | Fordahl et al. |         |

FOREIGN PATENT DOCUMENTS

| DE | 37 10816 A1 | 10/1988 |
| DE | 40 25 577 A1 | 2/1992 |
| WO | WO92/03186 | 5/1992 |

* cited by examiner

*Primary Examiner*—Jonathan Johnson
*Assistant Examiner*—Michael Aboagye
(74) *Attorney, Agent, or Firm*—John R. Benefiel

(57) ABSTRACT

An apparatus is disclosed for cutting a workpiece. A laser beam is directed at successive points along a workpiece surface to be cut and a sensor emits a sensing beam directed at the same successive points as the cutting beam. A beam combining device receives both the sensor beam and the cutting beam and causes downstream beam segments to be collinear with each other as they impinge the workpiece surface. The cutting is thereby able to be carried out in a single pass, and is precise, repeatable and independent of cutting depth, angle of cutting, scoring patterns, material inconsistency, material color, and surface grain variability.

30 Claims, 4 Drawing Sheets

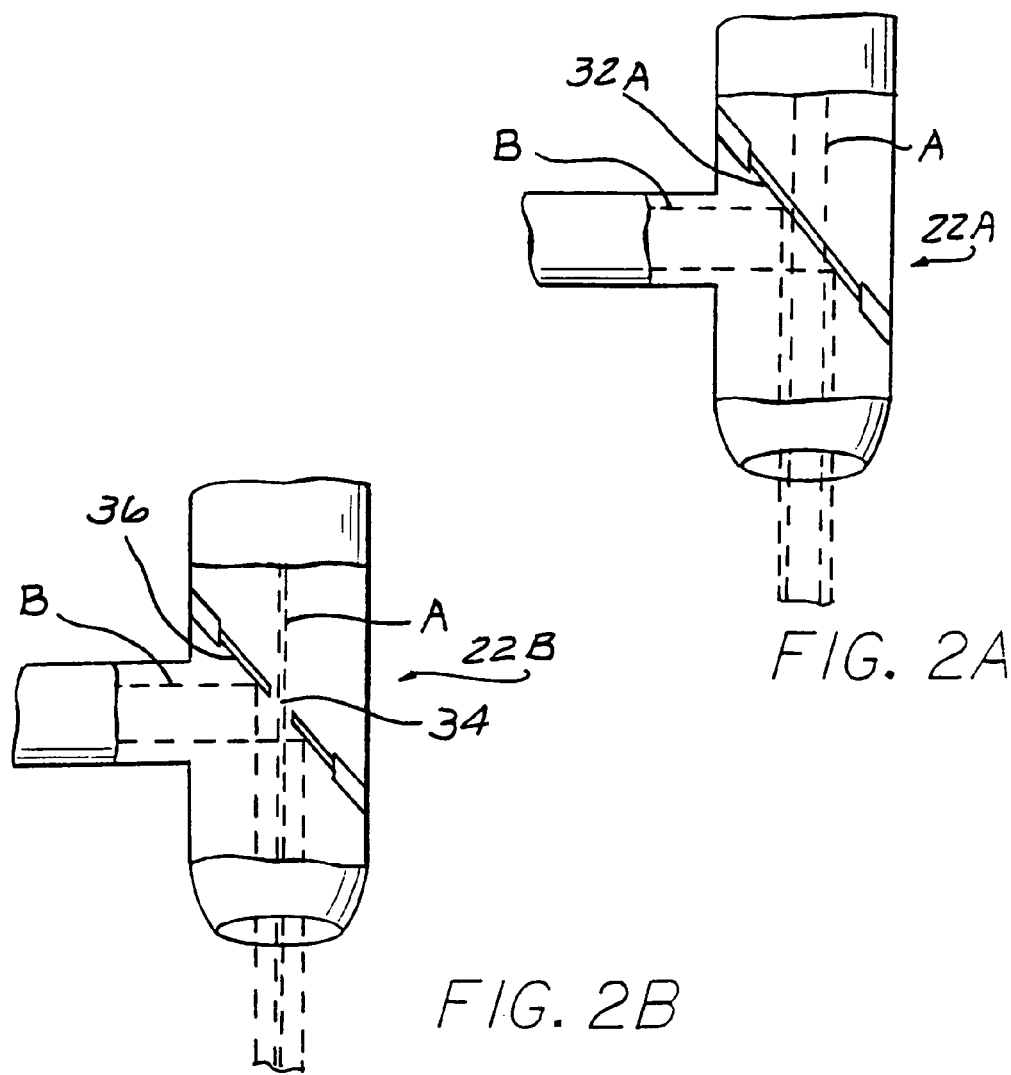
FIG. 2A
FIG. 2B
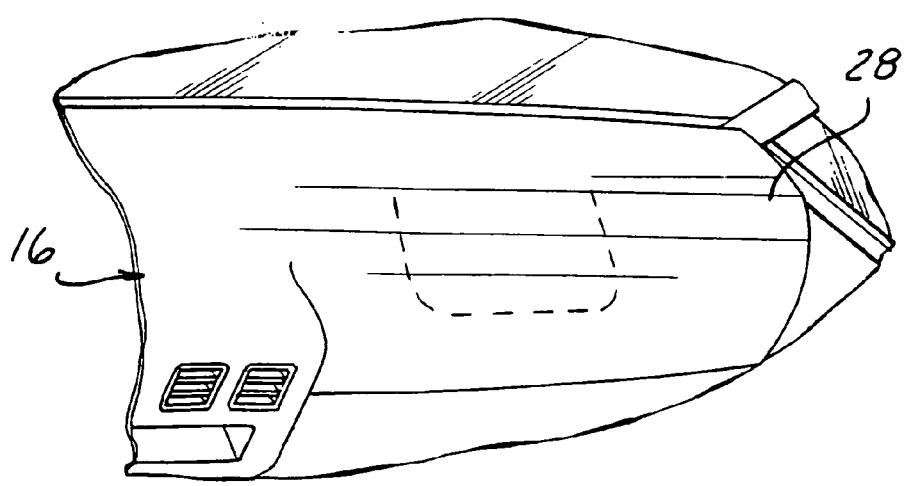
FIG. 3

PROCESS FOR LASER CUTTING A WORKPIECE

CROSS REFERENCE TO RELATED APPLICATIONS

This application is a divisional of U.S. Ser. No. 10/195,000, filed Jul. 12, 2002, now U.S. Pat. No. 6,737,607, which is a divisional of U.S. Ser. No. 09/811,152, filed Mar. 16, 2001, now U.S. Pat. No. 6,423,933, issued Jul. 23, 2002.

BACKGROUND OF THE INVENTION

This invention concerns a process for cutting workpieces by a laser beam to remove material by vaporization. In such apparatus, the laser beam is advanced along points forming a predetermined cutting pattern on a workpiece surface.

A widely used method for determining the extent of material removed during controlled cutting involves the use of triangulation type sensors as described in U.S. Pat. No. 5,883,356. These sensors, however, due to their triangulation operating principle, are limited in their ability to reach the bottom of the scoring produced by the cutting device. This is particularly so for narrow, deep penetrations which may be produced by cutting devices such as lasers and cutting knives. Furthermore, due to their offset mounting, these sensors are not well suited to measure the varying penetration depth that occurs during scoring at a specific location. This is especially true if the scoring penetration is in the form of partial perforations or slots. As such, the process does not lend itself to scoring the workpiece in an adaptive control mode, where both depth sensing and cutting are in registry with each other to impinge the same point on the workpiece, during the progression of scoring of the piece.

Accordingly it is an object of this invention to provide a process for laser beam cutting in a manner that provides accurate adaptive process control, single-pass processing, and lower manufacturing costs.

SUMMARY OF THE INVENTION

According to the invention, the cutting of the workpiece is accomplished by a process using a source of a controllable cutting laser beam, which, based on feedback obtained from at least one sensor emitting a sensing beam, is controlled in intensity together with controlled relative movement between the laser and the workpiece, producing a precise, predetermined cutting penetration into the workpiece along a predetermined pattern.

In this process, the laser cutting beam and sensing beam emitted from a first sensor are both directed at a surface on one side of the workpiece. A second sensor may also be positioned on the opposite side of the piece emitting a second sensor beam in opposition to the cutting laser beam. A beam combining device combines the laser cutting beam and first sensor beam together so as to have collinear segments directed at exactly the same point on the workpiece. The cutting of the workpiece is carried out by the laser beam while the piece is moved in a predetermined pattern relative to the laser. The depth of cutting of the work piece by the laser beam is controlled by real time feedback signals corresponding to the depth of the cut provided by the first sensor. To determine material thickness remaining during cutting of each point along the predetermined pattern, real time feedback from the second sensor can be provided combined with the feedback signals from the first sensor.

The sensor feedback can also be utilized to control the movement of the workpiece relative to the laser beam to enhance the cutting process control.

This process, due to the collinear arrangement of the impinging segments of the sensor and cutting beams, affords several advantages, including single-pass adaptive processing, cutting precision, and superior piece-to-piece repeatability. The cutting achieved is also independent of cutting depth, angle of cutting, scoring patterns, material inconsistency, material color, and surface variations.

Relative motion between the workpiece and the cutting beam to cut the piece in a predetermined pattern can be provided by different means including actuators, robots and X-Y tables.

The workpiece can have a monolayer, multilayer, or composite construction and can be scored on either side. The cutting can be continuous, intermittent or be a combination of both, and extend completely through one or more layers of the piece. The piece can be a finished part or a component which is subsequently integrated into a finished part.

DESCRIPTION OF THE DRAWINGS

FIGS. 2, 2A and 2B are fragmentary enlarged views of several alternative designs of the beam combining device incorporated in the apparatus shown in FIG. 1.

FIG. 3 is a perspective view of an automotive instrument panel with an integrated airbag deployment door formed by in a U pattern scoring carried out by the apparatus of the present invention.

DETAILED DESCRIPTION

In the following detailed description, certain specific terminology will be employed for the sake of clarity and particular embodiments described, but it is to be understood that the same is not intended to be limiting and should not be so construed inasmuch as the invention is capable of taking many forms and variations within the scope of the appended claims.

This invention describes an improved apparatus for cutting a workpiece with a laser cutting beam.

Figure 1:
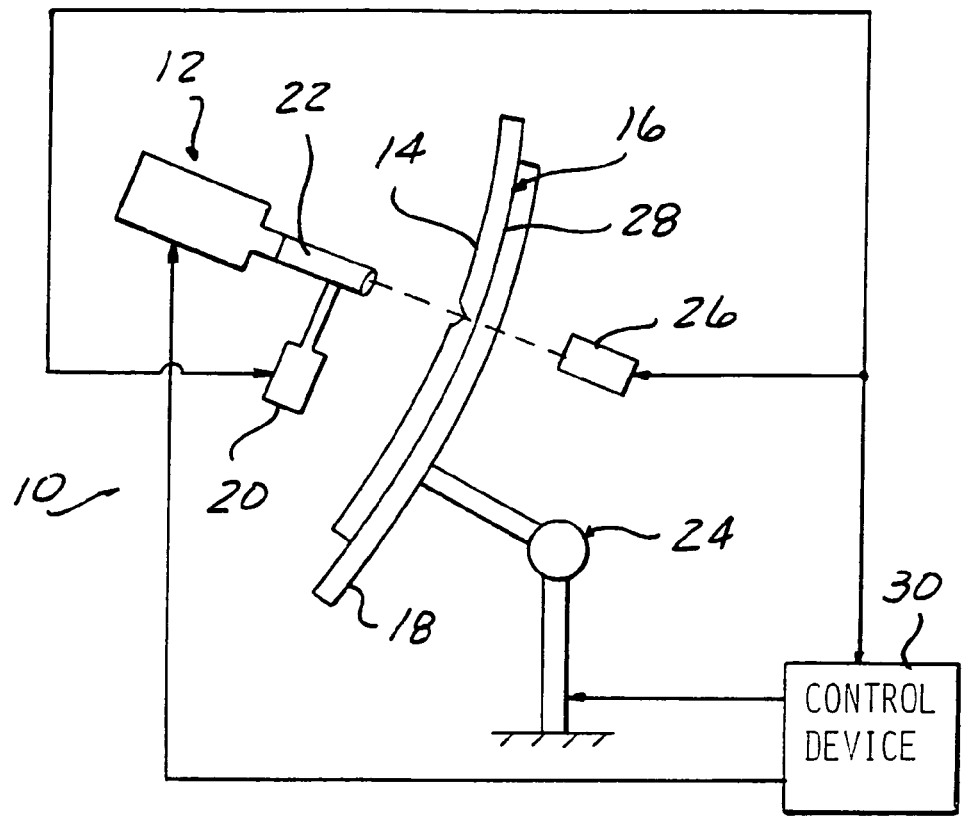
FIG. 1 is a diagrammatic view of the apparatus used in a process according to the invention including two sensors

FIG. 1 shows a first embodiment of a workpiece cutting apparatus 10 according to the invention. This includes a laser cutting beam source 12 which generates a laser cutting beam which can be used to carry out controlled scoring of a surface 14 on one side of a workpiece such as an instrument panel trim piece 16 that would overlie an airbag installation when installed.

The trim piece 16 is positioned on a holder which can comprise a fixture 18. A first sensor 20 is provided to determine the depth of scoring produced by the laser cutting beam B impinging onto the surface 14 of the trim piece 16 to score the same. The first sensor 20 and the laser cutting beam generator 12 are connected to a beam combining device 22. The beam combining device 22 (shown in detail in FIG. 2) is designed to combine the separately generated electromagnetic sensing beam A emanating from the first sensor 20 and the laser cutting beam B from source 12 so as to be in a collinear relationship and to direct the combined segments of the sensor beam A and cutting beam B so as to impinge the same precise spot on the trim piece surface 14. This beam combining device 22 will also redirect any reflected beam or beams required for sensor operation from the trim piece surface 14 back to the first sensor 20 as necessary in carrying out the process.

The trim piece 16 is moved relative to the cutting laser beam source 12, as well as the first sensor 20 and the beam combining device 22 via a motion actuator 24 drivingly engaged with the holder comprised of fixture 18 to cause tracing of a particular scoring pattern on the surface 14 and to achieve a precisely controlled rate of scoring. The motion actuator 24 can itself directly hold and move the trim piece 16 itself or move the optional fixture 18 onto which the trim piece 16 is mounted. Alternatively, the motion actuator 24 could be used to move the laser beam source 12 and the first sensor 20 relative to the trim piece 16.

A second sensor 26 may be located on the side of the trim piece 16 opposite the first sensor 20, a second sensor beam emanating therefrom, directed at the outer surface 28 of the trim piece 16 and aligned opposite the same trim piece point as is the laser cutting beam and the first sensor beam or beams are directed in order to control the scoring so as to produce a programmed thickness of material remaining after scoring. This is done by combining signals generated by both sensors 20, 26 to create a feedback signal corresponding to the thickness of the remaining material.

The apparatus 10 is operated via one or more industrial controllers 30 that control the scoring effected by the laser and/or the movement of the motion actuator based on a particular program and feedback signals provided by the sensor 20, 26.

Lasers that are particularly desirable for carrying out this type of scoring processes are of the carbon dioxide, excimer, solid state, argon gas, or diode type. However, based on the workpiece materials utilized (polymers, fabrics, wood, leather), the carbon dioxide laser is likely to be the most preferable in terms of operability, efficiency and cost. The laser can be operated either continuously or in a pulsed mode.

Different type of sensors can be utilized to measure the extent of material removed or remaining during scoring of the trim piece. For the first sensor 20, connected to the beam combining device 22, a preferred type is a closed loop device that sends and receives a specific beam of electromagnetic radiation in order to determine the depth of scoring effected by the laser. The Conoprobe sensors offered by Optimet and based on the technique of conoscopic holography, is one such sensor commercially available. In this type of sensor, an emitted laser beam and reflected return beams of visible light have segments also traveling in a collinear relationship with each other and the laser beam. Another type of sensor that could be utilized is one that detects reflected light beams such as a high speed CCD camera. In this application, the reflected beam will be reflected from the trim piece surface being scored by the cutting beam.

For the second sensor 26 aimed at the outside surface of the trim piece, which is generally smooth and accessible, there are more numerous options than electromagnetic beams and including infrared, laser, ultrasonic, conoscopic, CCD camera, proximity and contact type sensors.

The signal spot size of the first sensor beam selected can vary significantly. Generally the smaller the spot size the better. For the first sensor, the preferred size would not exceed the size of the scoring produced on the trim piece by the cutting laser beam. For the second sensor, if surface finish variations, so called grain, are significant, its spot size should preferably not exceed 300 microns.

Figure 2:
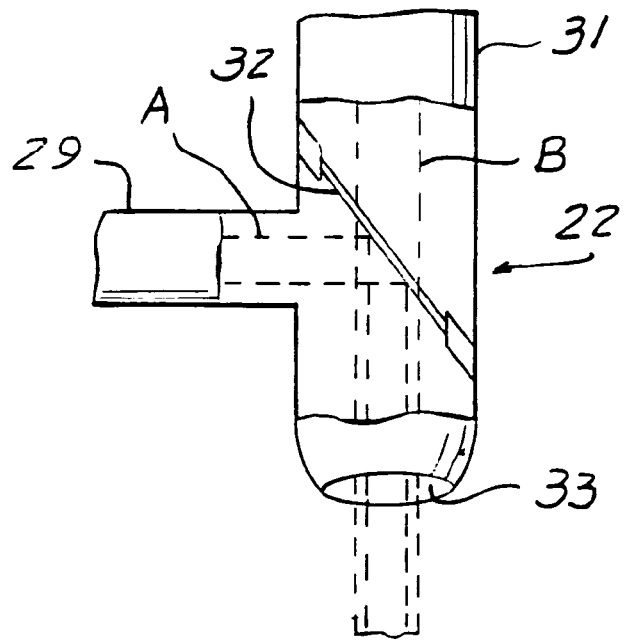
Figure 4:
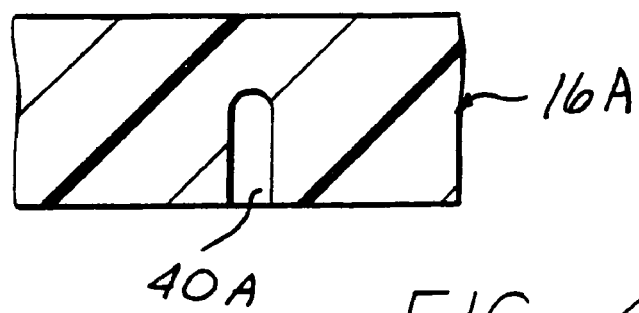
FIGS. 4 through 6 are cross sectional views of sample monolayer and multilayer trim piece constructions on which various types of trim piece weakening scorings can be made by the present apparatus.
Figure 5:
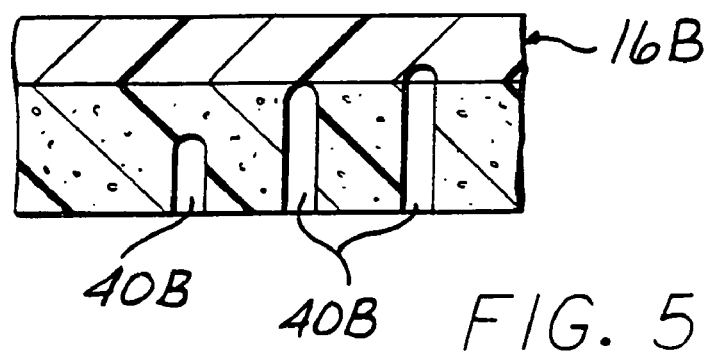
Figure 6:
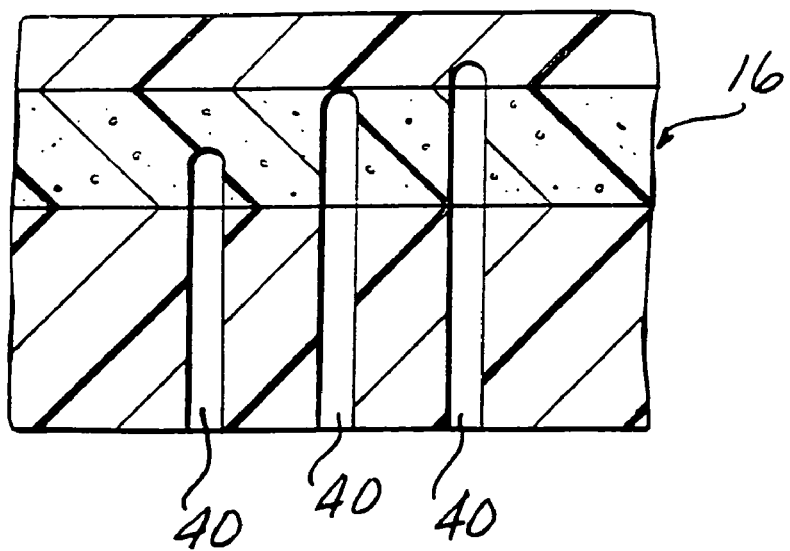

There are numerous ways for combining the separately originated cutting laser beam B and sensor beam A to create collinear segments thereof. FIG. 2 shows the inner details of the beam combining device 22 which combines the separate laser beam B and the first sensor beam A to create collinear segments which impinge the trim piece surface 14. The beam combining device 22 includes a reflector 32 having coatings causing reflection of light of the wavelength of the sensor beam A from its inclined surface while allowing the cutting laser beam B to be transmitted.

Such coated selective reflectors are commercially available. This of course requires that the laser and sensor beams be of different wavelengths.

A side entrance tube 29 directed at the reflector 32 is connected to the first sensor 20. The main tube 31 mounts the reflector 32, main tube 31 having an end opening 33 directed at the trim piece 16.

The segment of the sensor beam A reflected from the reflector 32 is caused to be collinear, i.e., aligned and coextensive with the segment of the laser beam B past the reflector 32, with both collinear segments then impinging the surface 14 at the same precise point.

FIG. 2A shows a second form of a beam combining device 22A having an inclined reflector 32A having coatings causing reflection of a beam having the wavelength of the cutting laser beam B, while allowing transmission of the beam having wavelengths of the sensor beam A to be transmitted therethrough to reverse the relationship shown in FIG. 2.

FIG. 2B is a simplified diagrammatic view of another form of the beam combining device 22B combining the cutting laser beam B and the first sensor beam A to produce collinear downstream segments thereof. This embodiment includes a simple mirror reflector 36 having a through hole 34. The hole 34 is small in diameter relative to the diameter of the cutting laser beam B in order to minimize or eliminate the effect that the presence of the hole 34 may have on reflecting the cutting laser beam from the mirror reflector 36 to redirect the cutting laser beam B. Such a mirror does not require coatings that are wavelength-selective such as those shown in FIGS. 2 and 2A in order to combine segments of the beams into a collinear relationship. In this particular arrangement, the first sensor 20 could be a CCD camera receiving beams reflected from the trim piece surface being scored by the laser beam.

In order to apply the complete scoring pattern, the trim workpiece is preferably moved relative to the laser beam and/or the sensors. The relative motion can be applied by a various types of motion actuators including robots and X-Y tables. During cutting, the sensor thickness data can also be used to control the movement of the motion device in order to apply the scoring along the predetermined pattern. The workpiece may be held directly by the motion device or be attached to a holding fixture held by the motion device. The holding fixture may be shaped to match the shape of the workpiece and/or be designed to register specific surface features of the workpiece. Vacuum or clamps could also be applied to the holding fixture to hold the trim piece surface in better contact with the fixture 18. The fixture 18 can be designed to allow the second sensor 26 to have physical and/or optical access to the surface 28 of the workpiece (i.e., transparent fixture wall, opening in fixture wall, etc.).

The process controller 30 is designed to control the operation of the laser and/or motion actuator based on the feedback signals provided by the two sensors 20, 26 which, from opposites sides or surfaces of the trim piece 16, monitor the location being scored. The two sensors 20, 26 working in tandem determine the remaining thickness of the trim piece 16 at any point they are directed to. During laser scoring at a given point, the two sensors 20, 26 provide signals from which a measurement of the material thickness remaining after the scoring can be derived by the control device 30. Based on this real-time thickness determination, the process control device 30 controls the operation of the cutting beam source 12 to effect only the desired extent of material removal intended for any given point on the workpiece 16. The remaining thickness data can also be used to control the motion actuator 24 to move the workpiece 16 to the next desired location along the predetermined scoring pattern.

Due to the collinearity of the impinging segments of the first sensor beam and the cutting beam, several advantages are realized that could not be attained by any of the existing processes. Since the first sensor beam and the laser beam are always impinging on the same point on the trim piece, the process becomes insensitive to a large number of key variables, including the angle of cutting, the depth of the penetration, the trim piece thickness, the configuration of the weakening pattern and, to a large extent, the speed of cutting. Also, the combination of the two sensors provides for a direct remaining thickness measurement, superior scoring precision and excellent part to part repeatability. In addition, the process enables the user to overcome variations in trim piece thickness, material properties such as density, color, voids and surface grain. These and other benefits are obtained while operating with rapid adaptive control in a single-pass mode.

This apparatus can be used in various processes, such as to cut or score a workpiece continuously or to form discontinuous cuts such as slots, grooves, etc., therein.

Figure 7:
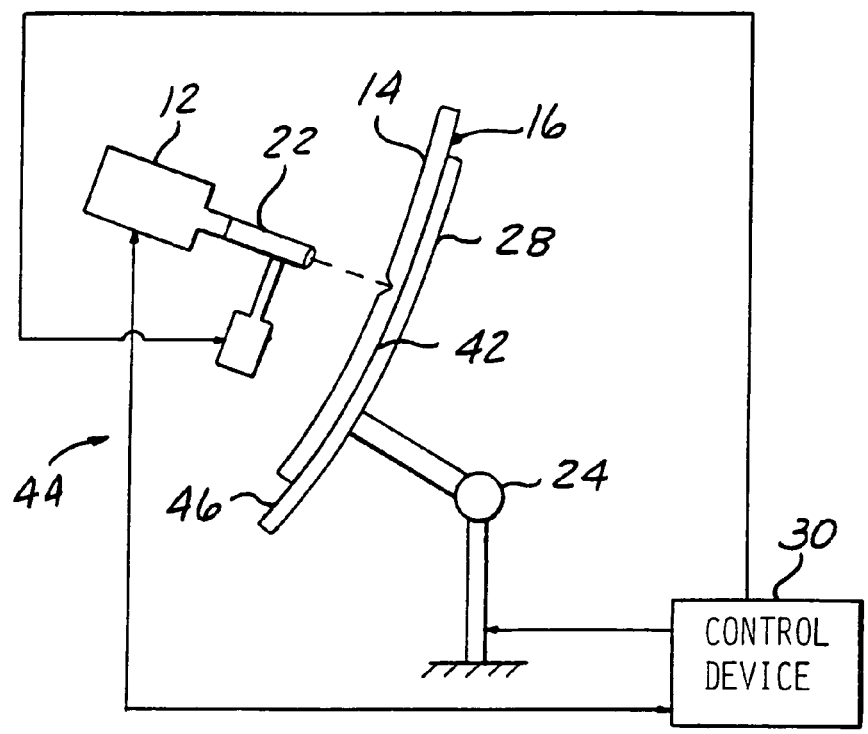
FIG. 7 is a diagrammatic view of a second apparatus used in a process according to the invention incorporating only a single sensor.

A second embodiment of the apparatus 44 according to the invention is shown in FIG. 7 where the outer surface 42 of the trim piece 16 is in intimate contact with the inner fixture wall 46. In this arrangement, the distance between the first sensor 20 and the fixture inner wall 46, along the predetermined scoring pattern, can be measured prior to starting the scoring operation. If this distance can be maintained constant from pass to pass, then the second outside sensor would not be necessary while still running the process in a single-pass, adaptive control mode.

Figure 8:
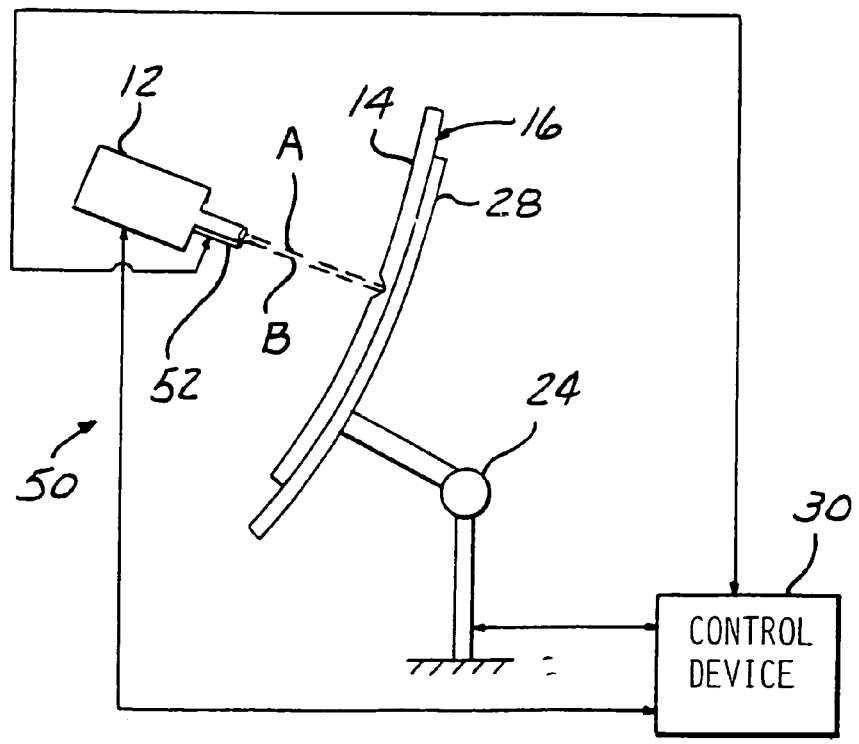
FIG. 8 is a diagrammatic view of another form of second embodiment of the apparatus according to the invention incorporating only a single sensor.

FIG. 8 shows another embodiment of the apparatus 50 where the first sensor 52 is mounted immediately alongside the cutting beam source 12 so that both beams A, B are substantially collinear with each other to approximate the effect of using the beam combining device 22 described.

The laser cutting beam may also function as the sensor. This arrangement also maintains the collinear configuration as the sensing signals and the laser beam are generated by the same laser. Under this approach, the laser beam characteristics and control would be manipulated to conduct sensing measurements during or between cutting intervals (i.e., sensing after a preset number of cutting pulses).

The invention claimed is:

1. A process for cutting lines of weakness into an automotive trim piece covering an airbag installation, said airbag installation including an airbag adapted to be inflated and deployed upon detection of a collision, said lines of weakness enabling formation of an airbag deployment door opening therein by pressure developed by deployment of said airbag, said trim piece having at least one layer, comprising:

partially cutting into a surface of the trim piece by directing a cutting beam from a cutting beam source onto to said surface and moving said trim piece relative to said source of said cutting beam in a predetermined weakening pattern;

monitoring the depth of cutting produced by said cutting beam by sensor beams produced from a first sensor and a second outer sensor respectively located on opposite sides of said trim piece and directed towards the trim piece location being cut by said cutting beam, said first sensor located on the same side of said trim piece as said cutting beam source;

said monitoring of the depth of cutting produced by said cutting beam including analyzing said first sensor beam and a return beam reflected from said surface after impingement by said first sensor beam by a conoscopic holography process;

combining said first sensor sensing beam with said cutting beam so that combined respective segments are collinear with each other when impinging said trim piece surface so as to be continuously directed at the same points along said weakening pattern;

controlling the extent of material removed by said cutting beam at each point along said predetermined weakening pattern by controlling said cutting in correspondence with feedback signals generated by said first and second sensors during said cutting; and, moving said trim piece relative to said cutting beam to partially cut said trim piece along said predetermined scoring pattern.

2. The process according to claim 1 wherein said cutting beam is a laser.

3. The process according to claim 1 wherein said cutting beam source is an ultrasonic generator.

4. The process according to claim 1 wherein said feedback signals provided by said first and second sensors together correspond to the material thickness remaining at each trim piece point being partially cut.

5. The process according to claim 1 wherein said trim piece is held in a fixture shaped to provide intimate contact with the outer surface of said trim piece.

6. The process according to claim 1 wherein said feedback signals produced from said sensors are used to also control the relative movement of the trim piece and scoring beam.

7. A process for cutting lines of weakening into an automotive trim piece covering an airbag installation, said airbag installation including an airbag adapted to be inflated and deployed upon detection of a collision, said lines of weakening enabling formation of an airbag deployment door opening by said trim piece having at least one layer, comprising the steps of:

partially cutting into a surface of said trim piece by directing a cutting beam at said inside surface from a cutting beam source, and relatively moving said trim piece and said cutting beam source in a predetermined pattern after loading said trim piece onto a fixture where a surface of said trim piece is in contact with a surface of said fixture;

monitoring the depth of cutting effected by said cutting beam by feedback signals produced by a sensor located on the same side of said trim piece as said cutting beam source, said sensor having a sensor beam directed at said trim piece surface to be partially cut by analyzing said sensor beam and a beam reflected back from said surface after impingement by said sensor beam, by a conoscopic holography process;

combining said sensor beam and said cutting beam so as to have collinear segments thereof impinging said surface so that both beams impinge the same points on said trim piece;

controlling the depth of said cutting effected by said cutting beam at each point along said predetermined pattern in accordance with said feedback signals provided by said sensor; and, moving said trim piece relative to said cutting beam to partially cut said trim piece along said predetermined pattern.

8. The process according to claim 7 wherein said cutting beam source is a laser beam source.

9. The process according to claim 7 wherein said sensor beam is electromagnetic radiation of a different wavelength than said cutting beam which is also electromagnetic, and in said combining step, said sensor and cutting beams are both directed at a reflector which selectively transmits one beam and reflects the other as a result of the difference in wavelengths to cause segments of said respective beams to be collinear.

10. The process according to claim 9 wherein said reflector is inclined at 45° and in said combining step one beam is directed at a front face of said reflector to be reflected and the other beam is directed at a rear face of said reflector through which it is transmitted.

11. The process according to claim 7 wherein said sensor beam is of much smaller diameter than said cutting beam, and wherein in said combining step, said cutting beam is directed at an inclined reflector surface having a hole formed therein much smaller than said cutting beam, and said sensor beam is directed through said hole in a direction collinear to said cutting beam after being reflected from said reflector.

12. A process for weakening an automotive trim piece covering an airbag installation, said airbag installation including an airbag adapted to be inflated and deployed upon detection of a collision, said weakening enabling formation of an air bag deployment door opening by pressure developed by deployment of said airbag, said trim piece having at least one layer, comprising:

partially cutting into an inside surface of the trim piece by directing a cutting beam from a cutting beam source onto said inside surface and relatively moving said trim and said cutting beam in a predetermined pattern;

controlling the depth of said cutting effected by said cutting beam at each point along said predetermined pattern; and, monitoring the cutting produced by said cutting beam with feedback signals from a sensor located on the same side of said trim piece as said cutting beam source, said sensor having a sensing beam combined in a collinear relationship with said cutting beam and continuously impinging the same point on said trim piece as the cutting beam, said sensor determining the depth of cutting produced by said cutting beam by a conoscopic holography process.

13. The process according to claim 12 wherein said cutting beam source is a laser beam source.

14. The process according to claim 12 wherein said cutting beam source is an ultrasonic generator.

15. The process according to claim 12 wherein said trim piece is attached to a fixture shaped to provide intimate contact with an outer surface of said trim piece.

16. A process for weakening an automotive trim piece covering an airbag installation, said airbag installation including an airbag adapted to be inflated and deployed upon detection of a collision, said weakening enabling formation of an air bag deployment door opening by pressure developed by deployment of said airbag, said trim piece having at least one layer, comprising:

cutting into an inside surface of the trim piece by directing a cutting beam at said inside surface and relatively moving said trim piece and said cutting beam in a predetermined pattern;

controlling the depth of said cutting effected by said cutting beam at each point along said predetermined pattern; and, monitoring the depth of cutting effected by said cutting beam by feedback signals corresponding to the location of the bottom of said partial cutting produced by a sensor located on the same side of said trim piece as said cutting beam, said sensor located next to said cutting beam and directing a sensing beam at said trim piece, said sensor beam approximately collinear with said cutting beam, said sensor determining the location of the bottom of said cutting produced by said cutting beam by a conoscopic holography process.

17. The process according to claim 16 wherein said cutting beam is a laser beam.

18. The process according to claim 16 wherein said cutting beam is a beam of ultrasonic waves.

19. The process according to claim 16 wherein said trim piece is held on to a fixture shaped to provide intimate contact with the outer surface of said trim piece.

20. A process for scoring a work piece, comprising:

cutting into a surface of the work piece by directing a cutting beam from a cutting beam source onto to said surface and moving said work piece relative to said source of said cutting beam in a predetermined pattern;

monitoring the depth of cutting produced by said cutting beam by sensor beams produced from a first sensor and a second outer sensor respectively located on opposite sides of said work piece and directed towards the work piece location being cut by said cutting beam, said first sensor located on the same side of said work piece as said cutting beam source;

said monitoring of the depth of cutting produced by said cutting beam including analyzing said first sensor beam and a return beam reflected from said surface after impingement by said first sensor beam by a conoscopic holography process;

combining said first sensor beam with said cutting beam so that combined respective segments are collinear with each other when impinging said work piece surface so as to be continuously directed at the same points along said predetermined pattern;

controlling the extent of material removed by said cutting beam at each point along said predetermined pattern by controlling said cutting in correspondence with feedback signals generated by said first and second sensors during said cutting; and, moving said work piece relative to said cutting beam to cut said work piece along said predetermined pattern.

21. The process according to claim 20 wherein said cutting beam is laser.

22. The process according to claim 20 wherein said cutting beam source is an ultrasonic generator.

23. The process according to claim 20 wherein said feedback signals provided by said first and second sensors together correspond to the material thickness remaining at each work piece point being partially cut.

24. The process according to claim 20 wherein said work piece is held in a fixture shaped to provide intimate contact with an outer surface of said work piece.

25. The process according to claim 20 wherein said feedback signals produced from said sensors are used to also control the relative movement of said work piece and scoring beam.

26. A process for cutting into a work piece, comprising the steps of:
   cutting into a surface of said work piece by directing a cutting beam at said surface from a cutting beam source, and relatively moving said work piece and said cutting beam source in a predetermined pattern after loading said work piece onto a fixture where another surface of said work piece is in contact with a surface of said fixture;
   monitoring the depth of cutting effected by said cutting beam by feedback signals produced by a sensor located on the same side of said work piece as said cutting beam source, said sensor having a sensor beam directed at said work piece surface to be partially cut by analyzing said sensor beam and a beam reflected back from said surface after impingement by said sensor beam, by a conoscopic holography process;
   combining said sensor beam and said cutting beam so as to have collinear segments thereof impinging said surface so that both beams impinge the same points on said work piece;
   controlling the depth of said cutting effected by said cutting beam at each point along said predetermined pattern in accordance with said feedback signals provided by said sensor; and,
   moving said work piece relative to said cutting beam to cut said work piece along said predetermined pattern.

27. The process according to claim 26 wherein said cutting beam source is a laser beam source.

28. The process according to claim 26 wherein said sensor beam is electromagnetic radiation of a different wavelength than said cutting beam which is also electromagnetic, and in said combining step, said sensor and cutting beams are both directed at a reflector which selectively transmits one beam and reflects the other as a result of the difference in wavelengths to cause segments of said respective beams to be collinear.

29. The process according to claim 28 wherein said reflector is inclined at 45° and in said combining step one beam is directed at a front face of said reflector to be reflected and the other beam is directed at a rear face of said reflector through which it is transmitted.

30. The process according to claim 26 wherein said sensor beam is of much smaller diameter than said cutting beam, and wherein in said combining step, said cutting beam is directed at an inclined reflector surface having a hole formed therein much smaller than said cutting beam, and said sensor beam is directed through said hole in a direction collinear to said cutting beam after being reflected from said reflector.

* * * * *